Aug. 21, 1934.            G. L. BENNETT            1,970,592
            LESS THAN CARLOAD FREIGHT CONTAINER
                    Filed Nov. 10, 1933
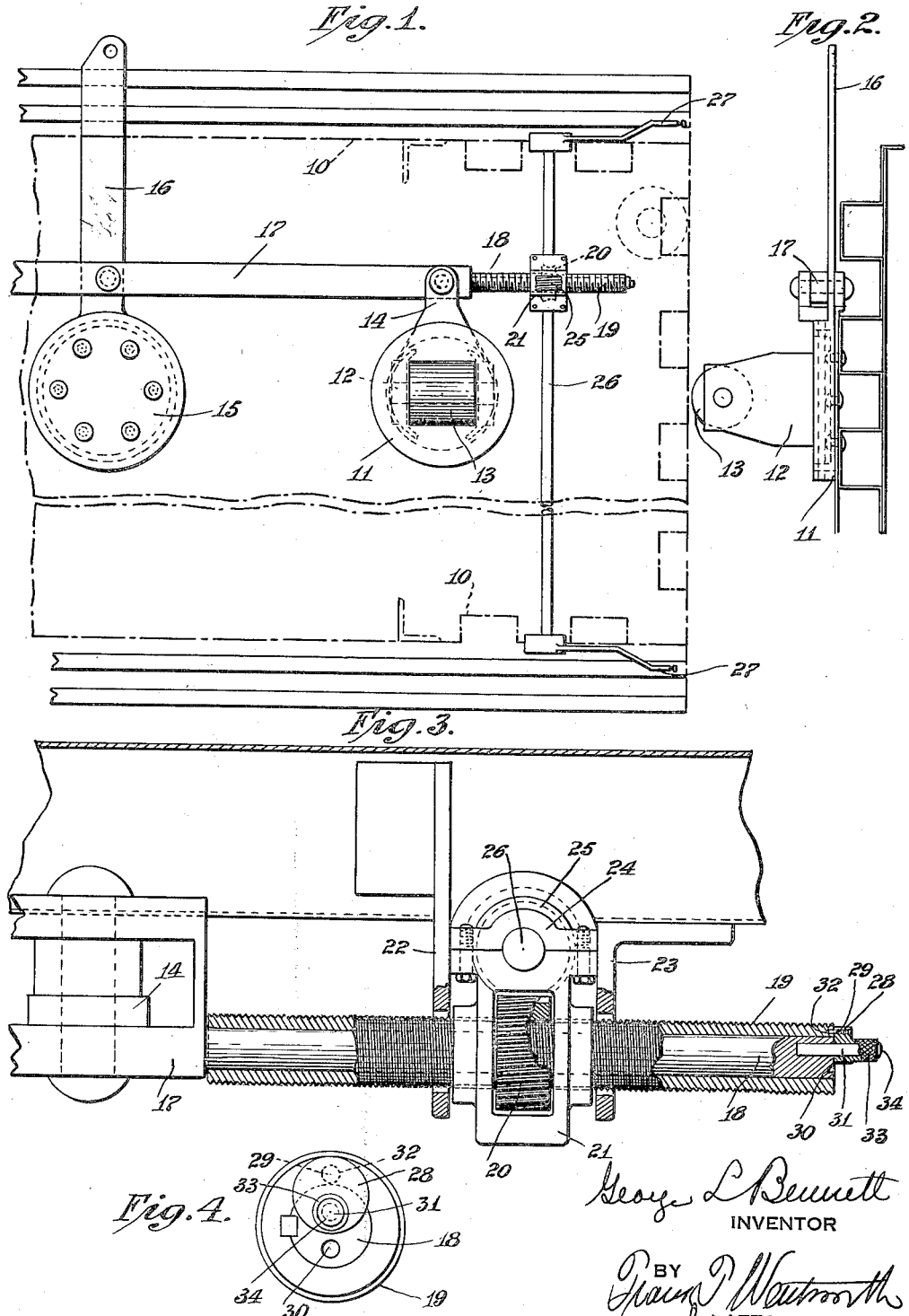
George L. Bennett
INVENTOR
BY
ATTORNEY.

Patented Aug. 21, 1934

1,970,592

UNITED STATES PATENT OFFICE 1,970,592

LESS THAN CARLOAD FREIGHT CONTAINER

George L. Bennett, Terre Haute, Ind.

Application November 10, 1933, Serial No. 697,443

4 Claims. (Cl. 280—98)

The invention relates to a less than carload freight container, and more particularly to a steering mechanism therefor permitting the actuation of the steering wheels from either end of the container or permitting said steering mechanism to be made inoperative so that a container may be hauled by a tractor without interference from the manually operative steering mechanism.

I have heretofore provided a less than carload freight container mounted upon wheels and equipped with means whereby the load of a container may be applied to the platform of a flat car through parts so actuated as to prevent movement of the container upon its wheels during transportation. A container mounted upon wheels is desirable, since it permits the loading or unloading of a container from a flat car without the aid of derricks, cranes or other devices, thus facilitating the shipment of less than carload lots to railway freight houses and the movement of the containers to and from cars, loading platforms, trucks, etc. where handling facilities are not available.

Such containers must be manually propelled while being loaded or unloaded from cars, loading platforms or trucks, but when in a warehouse or factory may be towed by tractors or other conveyances from place to place to permit the convenient placing of freight therein, or its removal therefrom.

Such containers when filled may weigh six or seven tons and since it frequently happens that they must be moved up or down gangplanks having a considerable incline, the manually operative steering mechanism employed must not only be positively actuated, but must be self-locking to avoid possibility of resistance to movement of the container, turning the steering wheels beyond a desired extent. It is also desirable that the actuating means for this steering mechanism be provided with controls positioned at opposite ends of the container where they may be readily accessible to a laborer who is actuating the driving mechanism for propelling the container.

The invention consists primarily in a less than carload freight container embodying swivelling side fittings adjacent opposite sides and one end thereof, a swivelling fitting including a drawbar intermediate said side fittings, wheels mounted in each of said side fittings, a link connecting said fittings and said drawbar, a screw threaded sleeve carried by said link, means connecting said sleeve with said link, a gear having interior screw threads meshing with the screw threads upon said sleeve, an actuating shaft, a gear carried thereby enmeshed with said first named gear, and actuating means for said shaft at an end of the container; and in such other novel features of construction and combination of parts, as are hereinafter set forth and described, and more particularly pointed out in the claims hereto appended.

Referring to the drawing,

Fig. 1 is a longitudinally condensed view of a container shown in dotted lines equipped with the steering mechanism of the invention;

Fig. 2 is a view from the left of Fig. 1 showing a steering wheel fitting;

Fig. 3 is a side view of the mechanism imparting movement to the steering wheel; and Fig. 4 is a detail view showing the mechanism for connecting or disconnecting the screw with the link.

Like numerals refer to like parts throughout the several views.

In the embodiment of the invention shown in the drawing, the container proper is shown in dotted lines at 10. Secured to the under side of the container at one end and adjacent opposite sides thereof are bearing housings 11 in which a swivelling fitting 12 is mounted by means of roller bearings or in any other desired manner. Each swivelling fitting has a roller or wheel 13 mounted therein in any desired or approved manner, roller or ball bearings being used if desired.

Each fitting 12 is provided with a radial extension 14.

Intermediate the fittings 12 is a swivelling fitting 15 having a drawbar 16, by means of which the container may be coupled to a tractor when moving it about a warehouse or factory.

A link 17 is pivotally connected to each extension 14 and the drawbar 16 at the same radial distance from the axis of the swivelling fittings with the two-fold object of permitting the application of manual power to the fittings 12 and to transmit motion from the drawbar to the fittings when the container is being towed about a warehouse or factory.

When manually turning the fittings 12, which is done while moving the container by hand power, it is essential that, irrespective of resistance, shocks or jars, the amount of turning movement shall be under the control of those moving the container, since by reason of the great weight of a loaded container, a failure to properly steer the same would almost inevitably result in damage to the container and the contained merchandise and injury to the workman moving the container.

To permit this positive control of the steering wheel, and at the same time assure the development of sufficient power to turn the wheels, even though the container be moving at only a very low speed, I provide a mechanism, operative upon the link 17, which will not only impart the desired longitudinal movement to said link but will prevent movement of the link in excess of that imparted by said power actuating mechanism. This mechanism is also so constructed as to permit its disconnection from the link to permit the actuation of the two fittings through said link by movement of the drawbar when the container is being towed.

To secure the above mode of operation, I provide the link 17 with a shouldered rounded end 18. Upon this rounded end 18 is a screw threaded sleeve 19, which is splined thereto to prevent turning movement of the sleeve in relation to the link and connecting the sleeve with the link while permitting movement of the link independently of the sleeve under certain conditions to be referred to hereinafter.

Mounted upon the screw threaded sleeve 19 is a worm gear 20 having interior screw threads enmeshed with the threads upon the sleeve. The worm gear 20 is mounted in a fitting 21 carried by brackets 22 and 23 pendant from the underframe of the container. Also carried by these brackets is a combined bearing housing and thrust block 24 for a worm 25 enmeshed with the worm gear 20 and carried by a shaft 26 extending from end to end of the container, and provided at each end with a hand crank 27, by means of which the shaft 26 and the worm 25 may be actuated to turn the worm gear 20 upon the screw threads of the sleeve 19 in a manner to impart longitudinal movement to the sleeve and to the link 17. Other gearing may be used in lieu of the gearing 20 and 25.

The end of the rounded portion 18 has pivoted thereto a stop plate 28 having a spring pressed stud 29 adapted to enter a socket 30 in the end 18. The pivotal connection of the stop plate is eccentric thereto and to the shaft 18. The support for the plate consists of an extension 31 eccentrically of the shaft 18. The end of the sleeve 19 is also provided with a socket 32 with which the stud 29 is adapted to cooperate.

The stop plate 28 is revolvably mounted upon the eccentric extension 31, and is provided with a knurled head 33 by which the stop plate 28 may be rotated to bring it to a position to lap and engage the end of the sleeve 19 or to a position concentric with the rounded end 18. The end of the extension 31 is enlarged as shown at the shoulder 34 to prevent the escape of the plate 28 from said extension.

The stop plate 28 being of substantially the same diameter as the rounded portion 18 of the link, when it is turned to the position shown in Figs. 3 and 4, movement of the sleeve 19 longitudinally of the rounded end 18 of the link is prevented, but when said stop plate is brought to a position concentric with the end of the shaft or rounded portion 18 of the link 17, said sleeve may have movement longitudinally of the link in a manner to bring it to a position where the link may have movement in relation thereto, notwithstanding that the worm gear 20 and worm 25, while idle, will effectively lock said sleeve against longitudinal movement.

The operation of the herein described steering mechanism is substantially as follows:—

When the container is to be moved by manual power applied to its driving mechanism, the screw threaded sleeve 19 is positioned to the left, as shown in Fig. 3, with one end thereof abutting against the link 17 adjacent the rounded extension 18, and the other end thereof flush with the end of the part 18 adjacent the extension 31. The spline connection between the sleeve 19 and the part 18 prevents rotation of the sleeve. When the sleeve is in this position, the stop plate 28 is turned to the position shown in Fig. 4 by means of the knurled head to disengage the stud from the recess 30 and engage it with the recess 32 so as to maintain this position of parts.

With this setting of parts it will be noted that the sleeve 19 is confined between the stop plate 28 and the shouldered end of the link 17, so that the turning of the worm gear 20 imparts longitudinal movement to said sleeve and the link 17 as a unit.

By locating a crank 27 at each end of the container, it is possible, when the container is at rest or in motion, to actuate the shaft 26 from either end of the container. The turning of said shaft will, through the worm 25, turn the worm gear 20 upon the screw threads of the sleeve 19 and thus impart longitudinal movement to said sleeve and to the link 17 in a direction according to that in which the shaft 26 is turned. Movement of the link 17 will impart turning movement to the fittings 12 of the steering wheels and also to the drawbar 16.

It is essential that the supports 22 and 23 be provided with openings for the passage of the sleeve 19 to compensate for the parallel movement of this sleeve and of the fitting 21 due to the arcuate movement of the extensions 14, the shaft 24 also being capable of longitudinal movement with said fitting 21 to ensure continued enmeshing of the worm gear 20 and worm 25. This movement, however, will never be great, its range being only slightly more than an inch with the maximum turning movement of said fittings.

When a container is in a ware house or factory and it is desired to tow it from place to place by means of a tractor or other engine, said tractor or engine is coupled to the drawbar 16, and to permit the free turning movement of the wheels by the drawbar, it is necessary to disconnect the link 17 from the shaft 26. This is done by bringing the stop member 28 concentric with the extension 18 and locking it in this position by means of the stud 29. The shaft 26 is then turned to move the sleeve 19 so as to bring one end thereof well away from the link proper 17. The spacing of the sleeve from the link permits the rounded extension 18 thereof to slide freely within the sleeve to an extent required to give the maximum turning movement to the fittings 12. In this manner, locking effect of the worm gear 20 and worm 25 upon the link 17 is avoided.

The steering mechanism of the invention is composed of few parts capable of developing sufficient power, when manually operated, to positively turn the steering wheels, and permits the actuating means therefor to be located where they will be conveniently accessible to workmen engaged in applying manual power for moving the container.

Furthermore, as heretofore pointed out, the mechanisms employed will limit the turning movement of the steering wheels to that imparted thereto by the steering mechanism, and thus avoid likelihood of accident due to the accidental turning of the wheels in excess of that required.

It is not my intention to limit the invention to the precise details of construction shown in the accompanying drawing, it being apparent that such may be varied without departing from the spirit and scope of the invention.

Having described the invention, what I claim as new and desire to have protected by Letters Patent, is:—

1. A less than carload freight container embodying swivelling side fittings adjacent opposite sides and one end thereof, a swivelling fitting including a drawbar intermediate said side fittings, wheels mounted in each of said side fittings, a link connecting said fittings and said drawbar, a screw threaded sleeve carried by said link, means connecting said sleeve with said link, a gear having interior screw threads meshing with the screw threads upon said sleeve, an actuating shaft, a gear carried thereby enmeshed with said first named gear, and actuating means for said shaft at an end of the container.

2. A less than carload freight container embodying swivelling side fittings adjacent opposite sides and one end thereof, a swivelling fitting including a drawbar intermediate said side fittings, wheels mounted in each of said side fittings, a link connecting said fittings and said drawbar, a screw threaded sleeve carried by said link, means whereby said sleeve is held against rotation on, but is permitted to have movement longitudinally of, said link, means movably mounted upon said link and adapted to be engaged with, or disengaged from, said sleeve, whereby movement of said sleeve will impart corresponding movement to said link, or said sleeve may be so positioned as to permit movement of said link independently of said sleeve, a worm gear having interior screw threads meshing with the screw threads upon said sleeve, an actuating shaft, a worm carried thereby enmeshed with said worm gear, and actuating means for said shaft at an end of the container.

3. A less than carload freight container embodying swivelling side fittings adjacent opposite sides and one end thereof, a swivelling fitting including a drawbar intermediate said side fittings, wheels mounted in each of said side fittings, a link connecting said fittings and said drawbar, and having a reduced end, a screw threaded sleeve slidably mounted upon the reduced end of said link, means whereby said stop plate may be engaged with one end of said sleeve and engage the other end of said sleeve with said link, or be disengaged from said sleeve to permit movement thereof upon said reduced end and movement of said link independently of said sleeve, a worm gear having interior screw threads meshing with the screw threads upon said sleeve, an actuating shaft, a worm carried thereby enmeshed with said worm gear, and actuating means for said shaft at an end of the container.

4. A less than carload freight container embodying swivelling side fittings adjacent opposite sides and one end thereof, a swivelling fitting including a drawbar intermediate said fittings, wheels mounted in each of said side fittings, a link connecting said fittings and said drawbar and having a male end, an extension eccentrically of said end, a screw threaded sleeve slidably mounted upon the reduced end of said link, a stop plate pivotally mounted eccentrically thereof upon said extension, whereby said stop plate may be engaged with one end of said sleeve and engage the other end thereof with said link, or be positioned concentrically with said reduced end to permit movement of said sleeve upon said reduced end and movement of said link independently of said sleeve, means carried by said stop plate and engageable selectively with said sleeve or said reduced end, a worm gear having interior screw threads meshing with the screw threads upon said sleeve, an actuating shaft, a worm carried thereby enmeshed with said worm gear, and actuating means for said shaft at an end of the container.

GEORGE L. BENNETT.